United States Patent [19]

Oseka

[11] Patent Number: 4,674,967
[45] Date of Patent: Jun. 23, 1987

[54] APPARATUS FOR FORMING ROLLED FOOD PRODUCTS

[76] Inventor: John A. Oseka, 125 Hillcrest La., Elyria, Ohio 44035

[21] Appl. No.: 765,688

[22] Filed: Aug. 15, 1985

[51] Int. Cl.$^4$ .............................................. B29C 43/00
[52] U.S. Cl. ...................................... 425/110; 53/390; 99/450.1; 248/311.2; 248/346; 425/319; 425/383; 425/436 R
[58] Field of Search ........... 425/110, 383, 319, 436 R; 211/1, 13, 40, 41, 74, 77; 248/311.2, 346; 131/56, 57, 58, 65, 66 R, 66.1, 67, 77, 85, 86, 87, 119; 99/450.1, 450.4, 450.5, 450.6; 53/452, 572, 578, 218, 219, 390, 461, 466

[56] References Cited

U.S. PATENT DOCUMENTS

| D. 170,798 | 11/1953 | Dundon et al. | 211/70.6 |
|---|---|---|---|
| D. 210,637 | 3/1968 | Greenfield | D80/1 |
| D. 257,608 | 12/1980 | Villalpando | D7/04 |
| D. 263,191 | 3/1982 | Moore | D7/37 |
| D. 263,786 | 4/1982 | Kohan | D7/105 |
| D. 267,143 | 3/1982 | Gessing et al. | D7/99 |
| D. 273,746 | 5/1984 | Hunt | D7/76 |
| D. 275,256 | 8/1984 | Gilliam | D7/76 |
| 1,318,007 | 10/1919 | Gau | 211/70.6 |
| 1,540,959 | 6/1925 | Schumacker | 211/70.6 |
| 3,433,363 | 3/1969 | Clearman et al. | 211/41 |
| 3,860,048 | 1/1975 | White | 211/74 |
| 3,923,156 | 12/1975 | Wallestad | 211/40 |
| 4,093,076 | 6/1978 | Newton | 211/74 |
| 4,270,660 | 6/1981 | Putt | D6/184 |
| 4,485,930 | 12/1984 | Savelkouls | 211/74 |
| 4,501,367 | 2/1985 | Potts | D7/70 |
| 4,506,796 | 3/1985 | Thompson | 211/74 |

FOREIGN PATENT DOCUMENTS

| 1111088 | 8/1954 | France . | |
| 1363467 | 5/1963 | France | 211/74 |

Primary Examiner—Willard E. Hoag
Attorney, Agent, or Firm—Fay, Sharpe, Fagan, Minnich & McKee

[57] ABSTRACT

An apparatus for forming rolled food products includes a pair of end members in generally spaced parallel relation. The end members each include an arcuate recess with a support member maintaining the end members in fixed relation to one another. The support member may include a plurality of support rods or a pair of support walls or even a planar base portion. Alternatively, the apparatus may be formed with a continuous curvilinear surface defining an arcuate recess. The method includes placing a first flexible mat in the apparatus, placing a second sheet on said mat, and filling a receiving cavity with food stuff. The assembly is thereafter rolled in the arcuate recess to form a sushi roll or other rolled food product.

16 Claims, 8 Drawing Figures

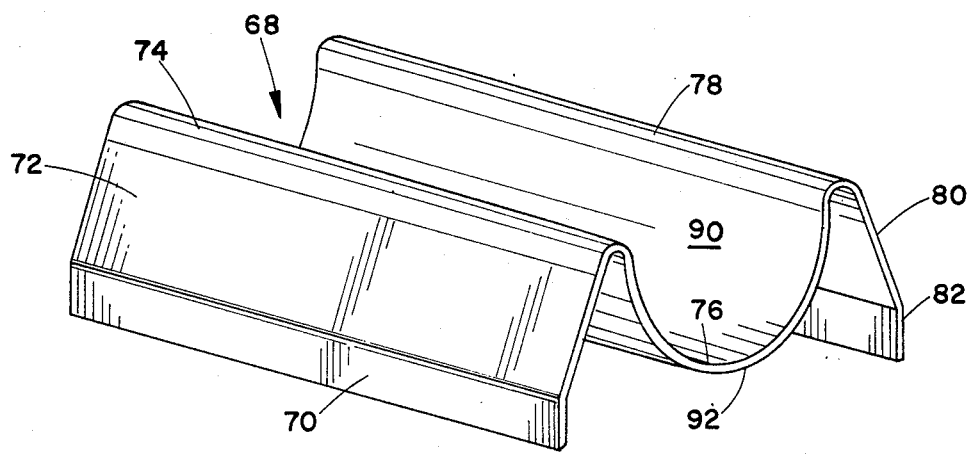
FIG. 4
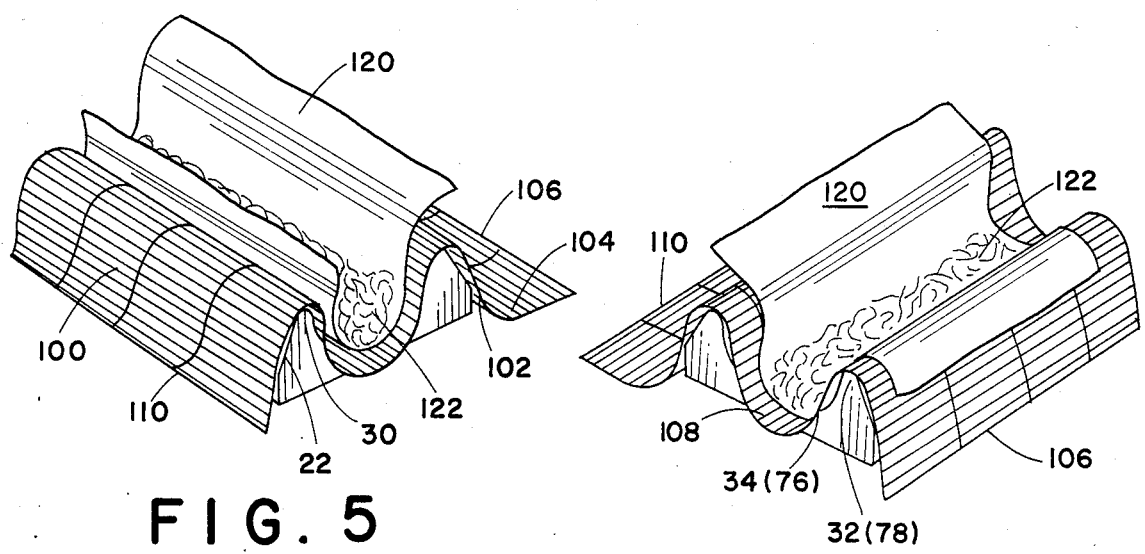
FIG. 5
FIG. 6
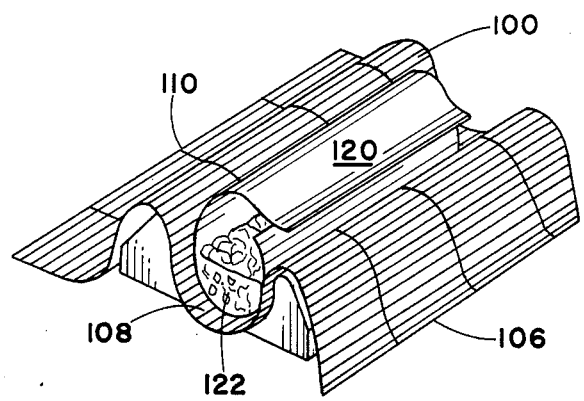
FIG. 7
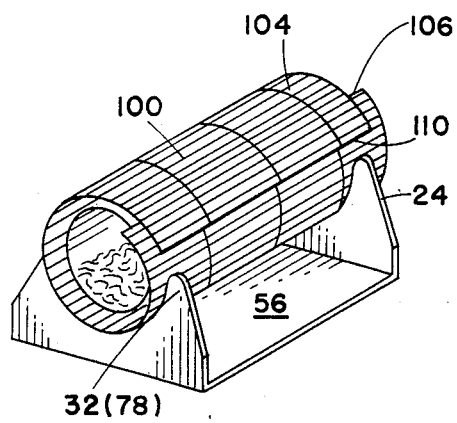
FIG. 8

4,674,967

APPARATUS FOR FORMING ROLLED FOOD PRODUCTS

BACKGROUND OF THE INVENTION

This invention pertains to the art of apparatus for forming comestible products and more particularly to rolled food products.

The invention is particularly applicable to an apparatus and method of forming sushi rolls and will be described with particular reference thereto. However, it will be appreciated that the invention has broader applications such as in other rolled food environments and applications.

A recent development receiving great attention in the area of foreign cuisine has been in the area of sushi rolls. The rolls may be used as an appetizer, a side dish, or as a convenient meal in and of themselves. The ability to prepare the sushi rolls ahead of time and keep them fresh for consumption at a later time adds to their popularity with the consumer public.

Conventionally, the art of forming the sushi rolls has been obtained from the Japanese culture and uses a sushi mat or the like. A conventional sushi mat is comprised of thin strips of bamboo arranged in generally parallel relation and fastened together with a thread or the like forming a flexible mat structure. The mat allows the sushi roll to be rolled tightly, yet air passes freely through the spaces between the separate bamboo members. The sushi mat is placed on a flat surface, such as a table top, and a sheet of nori, also known as amanori, is placed on the sushi mat. The nori is comprised of seaweed or the like that is dried and pressed and an important food product in Japanese cuisine. Various food stuffs are placed on the nori sheet for incorporation into the sushi roll. The nori sheet is slightly wetted along the edges to prevent the sheet from falling apart and the sushi mat is pulled up and pressed firmly against the nori and filling under a continuous rolling process whereby the completed food product is firmly packed in the sushi mat. The sushi roll may then be consumed as a complete roll or sliced into convenient sized pieces for consumption.

The art of rolling the sushi rolls requires a great amount of skill and manual dexterity in order to pack the sushi roll with adequate food stuff filling and present a product aesthetically pleasing to the consumer. When lacking the necessary skills, the nori roll tends to fall apart and the filling spills therefrom, both undesirable consequences.

It has been considered desirable, therefore, to develop a method and/or apparatus which assists in forming sushi rolls and other rolled products for both skilled and unskilled users. The subject invention is deemed to overcome the above noted shortcomings in the prior art.

SUMMARY OF THE INVENTION

Accoridng to the invention, an apparatus for forming rolled food products includes a pair of end members having arcuate recesses formed in each. A support member interconnects the first and second end members in a spaced relation.

According to another aspect of the invention, the support member may include a pair of wall portions extending from an open area of the arcuate recesses to a base edge of each of the end members.

In accordance with another aspect of the invention, plural support rods may be secured to the end members.

In accordance with another aspect of the invention, a generally continuous, curvilinear structure having a pair of support surfaces defining a generally arcuate recess therebetween is adapted for forming rolled food products.

In accordance with still another aspect of the invention, the arcuate recess is of generally circular configuration and defines a circumferential arc greater than 180 degrees.

In accordance with another aspect of the invention, a method for forming rolled food products includes the steps of positioning a flexible sheet over a member having an arcuate recess, placing food stuffs on the flexible sheet, folding one edge of the sheet toward the recess in covering relation with the food stuffs, and rotating one edge of the sheet along a path generally defined by the circumference of the arcuate recess.

In accordance with a further aspect of the invention, the method also includes the steps of placing a second flexible sheet of material on the first flexible sheet and closing the second sheet in covering relation with the food stuffs.

A primary advantage of the invention resides in an apparatus which easily forms a rolled food product.

Another advantage of the invention is set forth in the method of forming the rolled food products.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments and a method which will be described in detail in this specification and illustrated in the accompanying drawings which form a part hereof and wherein:

FIG. 4 illustrates still another alternative embodiment of the subject invention.

FIGS. 5-8 illustrate the method of forming rolled food products according to the subject invention.

DETAILED DESCRIPTION OF THE PREFERRED EMBODIMENT

Figure 1:
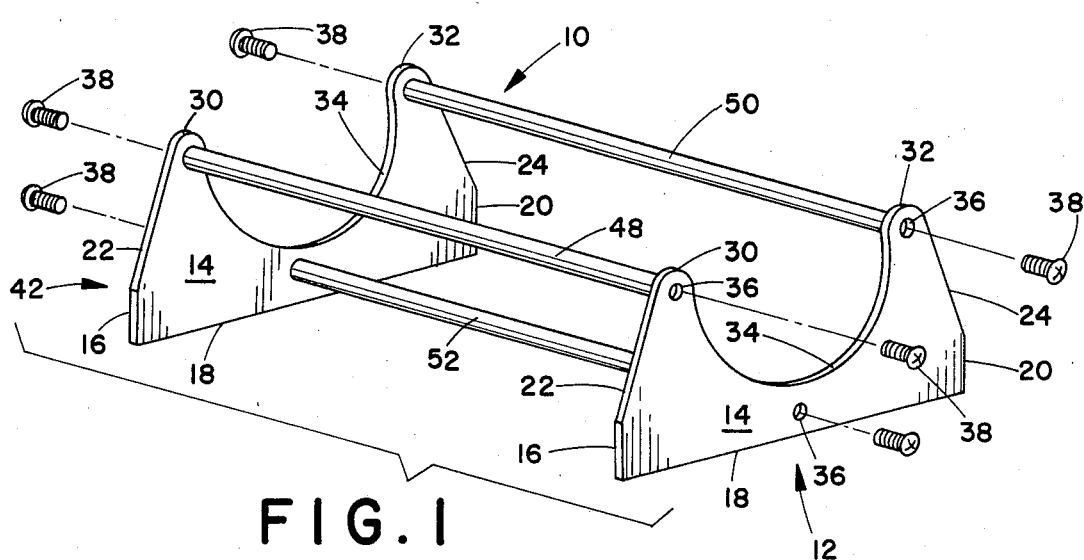
FIG. 1 is a perspective view of a preferred embodiment of the subject invention.

Referring now to the drawings wherein the showings are for purposes of illustrating the preferred embodiment, alternative embodiments, and method of the invention only and not for purposes of limiting same, FIG. 1 shows a preferred embodiment of the apparatus for forming rolled food products. The apparatus 10 includes a first end member 12 having a first generally planar surface 14 and a second generally planar surface 16. The end member may be formed of a thin material such as sheet metal, aluminum, an organic polymer such as plastic or the like and includes a generally planar base portion 18 adapted for abutting engagement with a flat surface such as a table top. An irregular outer periphery forms a pair of generally converging sidewalls 22, 24 that merge into curvilinear interconnecting portions 30, 32. The curvilinear interconnecting portions, in turn, merge together to form an arcuate recess 34. The arcuate recess is of generally circular configuration and preferably extends circumferentially from the spaced interconnection portions toward the base member 18 along an arc length defined by an angle greater than 180 degrees but less than 360 degrees. It will be understood by those skilled in the art that an arc length defined by an angle less than 180 degrees may also be used but the preferred angle of greater than 180 degrees assists a user of the apparatus in forming the rolled food products as will be explained further hereinafter. Plural apertures 36 are formed through the end member 12 and adapted to receive associated fasteners 38.

A second end member 42 is substantially identical in construction to the first end member 12 and, therefore, like numerals will identify like elements and new numerals identify new elements. The first and second end members 12, 42 are retained in generally parallel, spaced relation through the use of a support structure, specifically plural support rods 48, 50, and 52. The support rods 48, 50 are fastened to the end members 12, 42 adjacent the curvilinear interconnecting portions 30, 32 with fasteners 38. The support rods may be of solid or hollow construction and, once assembled with the end members, define a smooth, longitudinally extending surface on their exterior. The third support rod 52 is also fastened to the end members by means of fasteners 38. The rod 52 is disposed approximately at the lowermost point of curvature of the arcuate recess 34. It will be understood by those skilled in the art that the location of the support rods may be varied somewhat, or that additional rods may also be used. The support structure secures the substantially identical end members 12, 42 together so that the arcuate recesses 34 are substantially aligned. That is, the centers of the radius of curvature of the arcuate recesses share a common longitudinal axis, which axis, in the FIG. 1 embodiment, extends parallel to the support rods.

Figure 2:
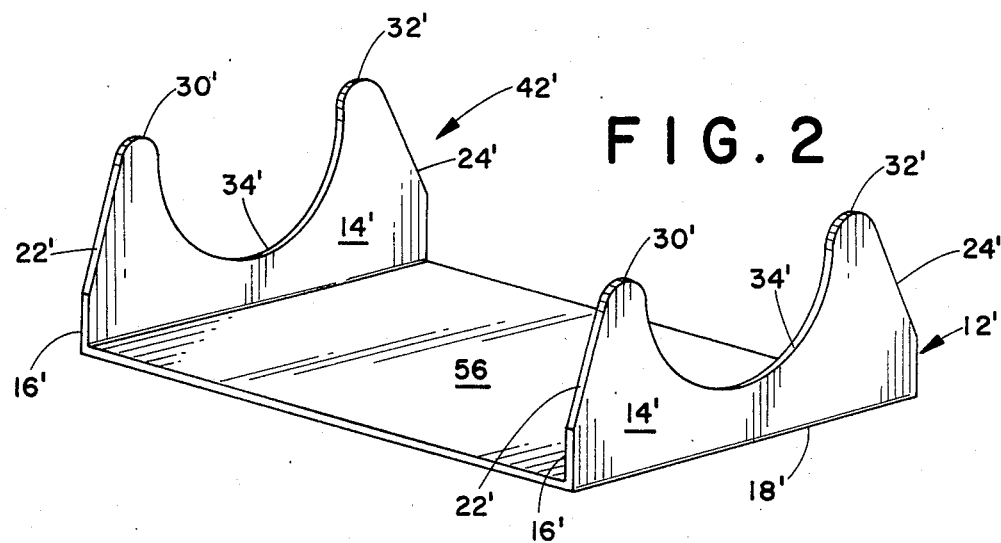
FIG. 2 is a perspective view of an alternative embodiment of the subject invention.

An alternative embodiment for the roll forming apparatus, is illustrated in FIG. 2. Like numerals with a prime suffix (') will be used to identify like elements and new elements will be identified with new numbers. A pair of end members 12', 42' each have first and second generally planar surfaces 14', 16' and a base portion 18'. The outer periphery includes a pair of generally converging sidewalls 22', 24' that merge into curvilinear interconnecting portions 30', 32'. The curvilinear interconnecting portions are disposed at the open outer arc length of an arcuate recess 34' formed in each of the end members. The end members are retained in a generally spaced, parallel relationship with the axes of the respective arcuate recesses generally aligned.

A support structure defined by gernally planar support member 56 extends from the base portion 18' of one end member to the base portion of the other end member. The alternative embodiment of FIG. 2 may be integrally formed of sheet metal, plastic, aluminum or the like whereby the end members are supported in a generally normal relation with the base member 56. The end members and planar support member 56 may also be separate members that are fastened in a conventional manner. The base member 56 is adapted for abutting engagement with a flat surface such as a table top or the like.

Figure 3:
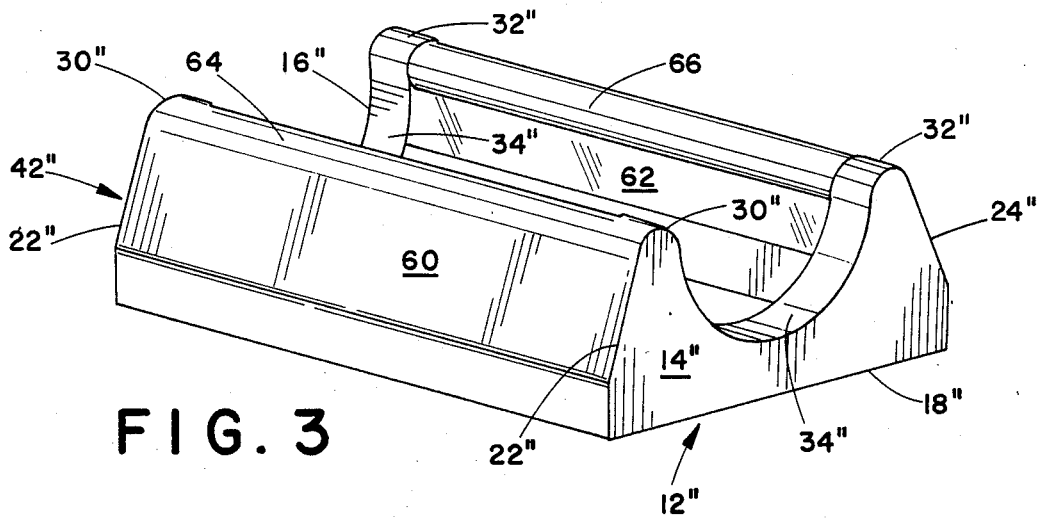
FIG. 3 is a perspective view of another alternative embodiment of the subject invention.

Another alternative embodiment is shown in FIG. 3 wherein like numerals having a double prime suffix (") will identify like elements and new numerals will identify new elements. A pair of end faces 12", 42" have first and second planar surfaces 14", 16". The base portions 18" are adapted for generally planar abutting contact with a flat surface such as a table top. The outer periphery of the end walls includes a pair of side walls 22", 24". The side walls extend from the base portion to a curvilinear interconnecting portion 30" or 32". An arcuate recess 34" is formed in each of the end members. The arcuate recesses in the end members are generally circular in conformation and, preferably, extend an arc length defined by an angle greater than 180 degrees. As noted above, angles less than 180 degrees may also be used but are not as advantageous. The support structure in the FIG. 3 embodiment includes a pair of side walls 60, 62 which extend from the base portion 18" to the curvilinear interconnecting portions along each side of the end members 12", 42". In fact, the side walls 60, 62 may be made integral with the end member side walls 22", 24" to form a solid, one piece structure. The side walls maintain the end members in a generally upright, spaced, parallel relation. Further, the top edge of the side walls defines a generally smooth, longitudinally extending surface 64, 66 on either side of the open ends of the arcuate recesses 34".

A third alternative embodiment is illustrated in FIG. 4 and defines a generally continuous, curvilinear apparatus 68. The apparatus 68 has a first portion 72 defining a supporting side wall extending from surface 70. The apparatus 68 merges into an upper, reverse curved area 74 and extends into an outer end of an arcuate recess 76. The material is formed to extend along an arc approximately 180 degrees, preferably greater, to a second, reverse curved area 78. The second reverse curved area 78 merges with a second supporting side wall portion 80 which terminates in a generally planar distal edge 82 for abutting engagement with a flat surface. The apparatus 68 may comprise a pair of continuous, curvilinear surfaces 90, 92 that define a thin, curvilinear structure or may include a solid member having a first surface that extends along the contours defined by surface 90. In comparison to the FIGS. 1-3 embodiments, the FIG. 4 embodiment has no end members and yet defines a similar type of supported arcuate recess area, adapted to forming rolled food products as will be explained hereinbelow. The FIG. 4 embodiment also may be formed of various rigid materials among them, sheet metal, aluminum and plastic.

With reference to FIGS. 5-8, the method of forming rolled food products will be described in detail. As seen in FIG. 5, a bamboo mat or similar mat 100 having opposed surfaces 102, 104 is positioned on one of the apparatus described above. Preferably, the mat defines a longitudinal length at least as long as the axial length of the above described apparatus. Commonly, the mat is formed of approximately the same width. A first edge 106 of the mat is adapted for abutting engagement with a flat surface, such as a table top, and the flexible mat is then placed in supporting position over the curvilinear interconnecting portion 32 (or reverse curved area 78 in the FIG. 4 embodiment). The mat extends in generally abutting connection with the arcuate recess 34 of the end members in the FIGS. 1-3 embodiments (or the arcuate recess 76 of the FIG. 4 embodiment) defining a receiving cavity 108 for the food stuffs. The opposed edge 110 of the flexible mat extends over the curvilinear interconnecting portion 30 for abutting engagement with the flat surface. Once the mat is correctly positioned in the apparatus, the mat assumes a curvilinear design generally corresponding to a rounded letter M.

The mat surface 102 contacts the roll forming apparatus while surface 104 faces outwardly away from the apparatus and is adapted for receipt of food stuffs in receiving cavity area 108 defined by the arcuate recess.

A thin sheet of amanori or nori 120 is then placed in abutting contact with the outer surface 104 of the flexible mat and, in turn, assumes the general shape of the arcuate recess forming the receiving cavity 108. Various food stuffs, including but not limited to, rice, vegetables, seafood and the like, is then placed on the nori 120 as generally indicated at 122. The food filling 122 is easily measured due to the predetermined depth of the arcuate recess and receiving cavity 108. The cavity may be filled slightly above the uppermost curvature of the mat extending over curvilinear interconnecting portions 30, 32. Once the desired amount of food stuffs have been placed upon the nori sheet, the edges of the nori may be wetted. The wet edges are then folded one on top of the other in covering relation with the food stuffs in the cavity. The wet edges assist in retaining the food stuffs within the nori sheet. The first edge 106 of the flexible mat is then lifted over the sealed nori to a position within the recessed area adjacent the curvilinear interconnecting portion 30. Rotation of the mat about the axis common to the arcuate recesses in a generally counterclockwise direction as illustrated, advances the first edge 106 of the mat along a path parallel to the arcuate recess 34 toward the second curvilinear interconnecting portion 32. During this rotation, the second edge 110 of the flexible mat proceeds along the side wall 22 toward the curvilinear interconnecting portion 30. Rotation of the mat continues with the rotated mat assembly remaining within the area defined by the arcuate recess. Once the second edge 110 of the flexible mat has entered the arcuate recess, further rotation of the mat is unnecessary and the rolled food product has been completed. The product may be stored in a rolled fashion within the flexible mat until desired for consumption. It will be understood by those skilled in the art that rotation of the mat may also follow a clockwise direction with equal success.

The embodiment of FIG. 4 may be used in the method described above, as well as for other rolled food products. For example, a rolled dough product may be formed by placing a generally flat sheet of dough material in abutting relation with the continuous curvilinear surface 90 of the apparatus. Various fillings may then be placed on the dough surface in a receiving cavity 108' formed by the arcuate recess 76. Lifting one edge of the dough toward reverse curved area 74, and continuing rotation of the product, assists in forming a rolled food product. Therefore, as is apparent, the flexible mat need not be utilized in all rolled food product applications with the FIG. 4 embodiment.

The above described apparatus and methods allow one to easily form rolled food products. The arcuate recess acts as a measuring device to form rolls of uniform size in addition to providing a "truer" round roll. The food products formed by the above noted method are attractive to the server as well as easily assembled. The apparatus having an arcuate recess formed of a circumferential arc greater than 180 degrees clips or assists in formation of the rolled food product. In addition, the apparatus is easily assembled, if assembly is required at all, is sturdy, and may be easily cleaned.

The invention has been described with reference to the preferred embodiment. Obviously modifications and alterations will occur to others upon a reading and understanding of this specification. It is intended to include all such modifications and alterations in so far as they come within the scope of the appended claims or the equivalents thereof.

Having thus described the invention it is now claimed:

1. An apparatus for forming associated rolled food products comprising:
   a first end member;
   a second end member in generally spaced parallel relation with said first end member;
   a supaort member interconnecting the first and second end member; and
   said end members defining arcuate recesses thherein; said arcuate recesses having a circumferential arc defined by an angle greater than 180° but less than 360° whereby an associated food product may be formed into a roll shape by rotating the food product about an axis common to both arcuate recesses and side walls extending between said end members from lowest extremeties of said ends and about upper portions of said ends, said walls spaced outwardly from said recesses except adjacent said upper portions to form smooth curved surfaces about said upper portions.

2. The apparatus as defined in claim 1 wherein said wall portions define generally planar, axially extending surfaces adjacent the open area of said arcuate recesses.

3. An apparatus for forming associated rolled food products comprising:
   a first end member;
   a second end member in generally spaced paralel relation with said first end member;
   a support member interconnecting the first and second end members;
   arcuate recesses formed in said end members, said arcuate recesses having a circumferential arc defined by an angle greater than 180° but less than 360°
   and a flexible member having a longitudinal axis operatively disposed in said arcuate recess and adapted to receive the associated food product thereon whereby an associated food product may be formed into a roll shape by rotating the food product about an axis common to both arcuate recesses.

4. The apparatus as defined in claim 3 wherein said flexible member is a split bamboo mat.

5. The apparatus as defined in claim 3 wherein said support member interconnects said end members along one portion of said end members forming a base for said device.

6. The apparatus as defined in claim 3 wherein said support member includes a pair of support rods secured to both end members at an area defined adjacent the open area of said arcuate recesses.

7. The apparatus as defined in claim 2 wherein said pair of support rods define generally planar axially extending surfaces.

8. The apparatus as defined in claim 2 wherein said support member further includes a third support rod mounted adjacent a base portion of said end members.

9. The apparatus as defined in claim 7 wherein said support rods are secured to said end members by a plurality of fasteners.

10. An apparatus for forming associated rolled food products comprising:

a generally curvilinear member having a pair of support surfaces in spaced relation defining a generally arcuate recess therebetween;

a pair of support legs extending from said support surfaces; and, a flexible member having a longitudinal axis operatively disposed in said arcuate recess and adapted to receive an associated food product thereon whereby the associated food product may be formed into a roll shape by rotating said flexible member generally about an axis of said arcuate recess.

11. The apparatus as defined in claim 7 wherein said support surfaces and support legs are an integral one-piece structure.

12. The apparatus as defined in claim 9 wherein said support legs are angularly disposed with respect to said support surfaces.

13. The apparatus as defined in claim 9 wherein said device is formed of an organic polymer material.

14. The apparatus as defined in claim 9 wherein said flexible member is a split bamboo mat.

15. The apparatus as defined in claim 9 wherein said arcuate recess is of generally circular conformation.

16. The apparatus as defined in claim 15 wherein said arcuate recess is formed from said support surfaces having a circumferential arc defined by an angle greater than 180 degrees but less than 360 degrees.

* * * * *

UNITED STATES PATENT AND TRADEMARK OFFICE
CERTIFICATE OF CORRECTION

PATENT NO. : 4,674,967
DATED : June 23, 1987
INVENTOR(S) : John A. Oseka

It is certified that error appears in the above—identified patent and that said Letters Patent is hereby corrected as shown below:

| | | |
|---|---|---|
| Col. 1, line 60 | "Accoridng" | --According--. |
| Col. 3, line 53 | "gernally" | --generally--. |
| Col. 6, line 12 | "supaort" | --support--. |
| Col 6, line 14 | "thherein" | --therein--. |

Signed and Sealed this

Twenty-ninth Day of December, 1987

Attest:

DONALD J. QUIGG

*Attesting Officer*   *Commissioner of Patents and Trademarks*